UNITED STATES PATENT OFFICE 2,618,822

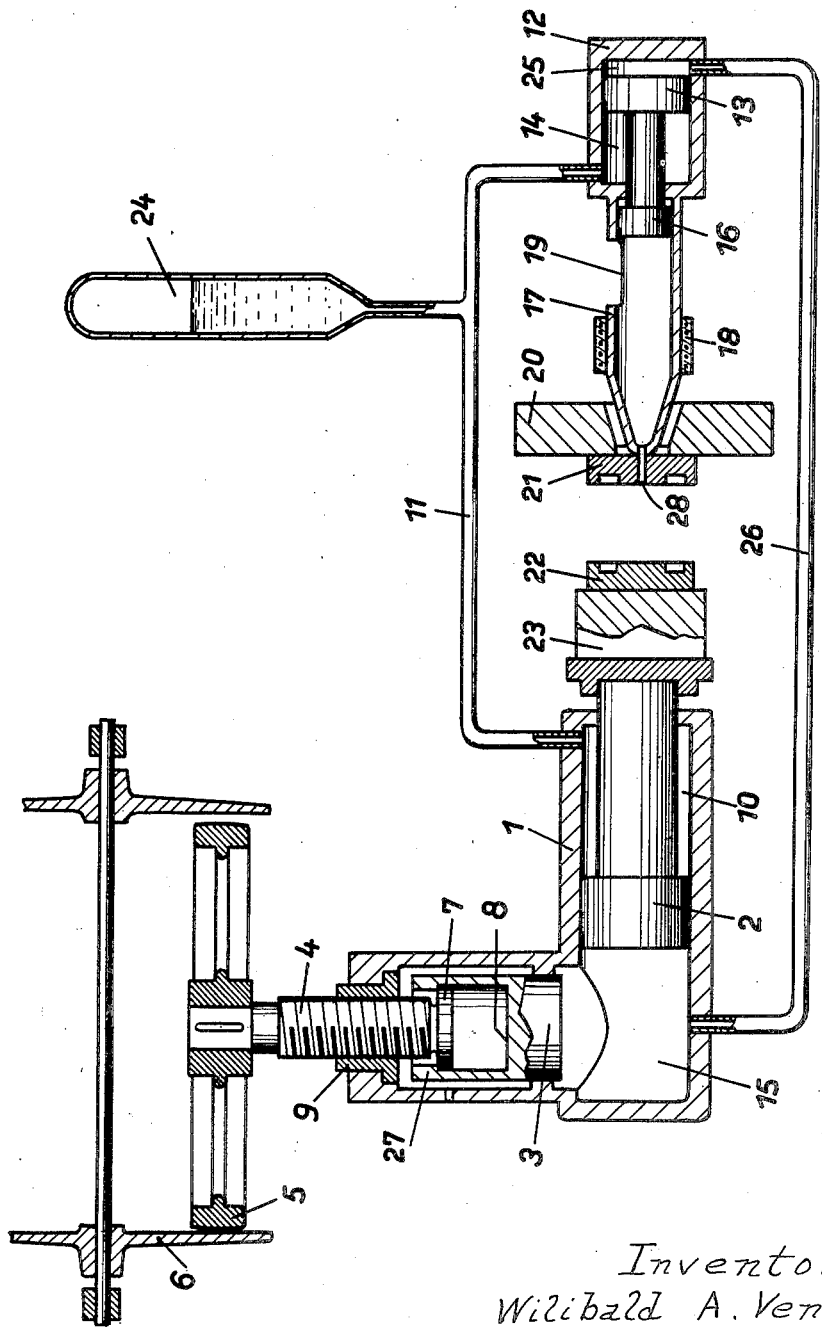

SYSTEM FOR DRIVING WORKING PISTONS IN DIE-CASTING MACHINES OR INJECTION MOLDING MACHINES

Wilibald A. Venus, Munich, Germany, assignor to Hahn & Kolb, Stuttgart-N, Germany Application September 28, 1949, Serial No. 118,285
In Germany October 1, 1948

5 Claims. (Cl. 22—68)

Working pistons in die-casting machines and injection molding machines for metal or thermoplastic materials respectively are in general hydraulically driven. The power is usually connected with a hydraulic system, while in some cases a separate driving unit is provided for every machine or group of machines. The working cycle—i. e. the closing stroke of the dies with a small forward force and a large locking force, forward motion of the injection plunger with a small adjusting force and a large injecting force with high or maximum speed—makes it imperative either to use accumulators, which store the continuous power of the pump or of the centrally charged pressure network up to the time when the piston on its forward stroke requires a large amount of energy or to use oversize multistage pumps dimensioned according to the peak requirements of the working cycle. The invention avoids all these drawbacks by combining the advantages of the hydraulic drive fractuating the working pistons with the possibilities of energy accumulation in mechanical drives. This is substantially achieved by inserting between the mechanical drive and the working piston with its constant delivery of pressure fluid a mechanical accumulator, preferably a flywheel, driven by a friction gearing.

It is advantageous to use, for producing the pressure necessary for operating the working piston, a piston mechanically connected with the accumulator which displaces the pressure fluid required for one working cycle of the machine in a single stroke. Accumulators preferably of the pneumatic-hydraulic type, are charged during the forward stroke of the machine and effect the return stroke of the working pistons. It is advantageous to dimension the return stroke and forward stroke operating areas in the die closing piston and the injection plunger such that the forward stroke of the injection plunger does not occur before the motion of the die closing piston is completed and the closing pressure has reached a certain amount. It is especially advantageous to employ, as mechanical accumulator on the driving side, a flywheel driven by a friction gearing, and to drive the pump piston through the latter, using a power screw as transmitting means in such a way that the piston is engaged by the flywheel only after it has traveled a certain idle stroke.

In the following description and in the drawing the invention is disclosed by way of example in accordance with a schematically shown injection molding machine, the invention being, however, in no way limited to this type of machine.

1 is a die closing cylinder, 2 a die closing piston, 3 a pump piston, 4 a power screw, 5 a flywheel, 6 a power friction wheel, 7 a screw head, 8 an arresting flat in the pump piston, 9 a nut, 10 an annular space, 11 a connecting line to the accumulating cylinder 24, 12 an injection cylinder, 13 an injection piston, 14 an annular space, 15 a pressure chamber between pump piston 3 and die closing piston 2, 16 an injection head, 17 a heating cylinder for the plastic material, 18 a heater, 19 a filling hole, 20 a stationary plate, 21 a stationary die-half, 22 a movable die-half mounted on the form locking box 23, 25 a pressure chamber behind the injection plunger connected through line 26 with pressure chamber 15 located between mold closing piston 2 and pump piston 3, 27 a stop on the upper end of the pump piston 3, and 28 a sprue arranged in die-half 21. The pressure chambers 15, 25 and their connecting line 26 are completely filled with pressure liquid. The same holds true for the annular chambers 10 and 14 as well as connecting line 11. The accumulating cylinder 24 is, in accordance with the piston position shown, half full of liquid and, in its upper half, filled with compressed air or with nitrogen. The proportion of the right annular ring face of piston 2 in room 10 to the left front face of piston 2 is smaller than the proportion of the left annular ring face of piston 13 to the right front face of piston 13. As the rooms 15 and 25 are connected with each other, and as rooms 10 and 14 are connected with each other, the pressure in accumulator 24 will, after the pressure in room 15 has decreased, at first move the piston 13 to the right before the piston 2 begins its movement to the left.

The operation of the system is as follows:

When flywheel 5 is driven, for instance by forcing driving disc 6 against its rim, power screw 4 is rotated, and nut 9 moves screw 4 downward with ever increasing speed. In doing so, the energy supplied by the driving motor is stored in flywheel 5. When power screw head strikes against stop 8 of pump piston 3, pump piston 3 is forced downward, producing in space 15 a certain pressure, which acts on die closing piston 2, moving it forward, as soon as the pressure on the piston exceeds, aside from friction, the opposed pressure exerted by the pressure liquid in accumulating cylinder 24 and annular space 10 connected therewith. Die closing piston 2 thus closes die 21, 22 and consumes, in doing so, from the energy continuously supplied by the driving motor only that part necessary to overcome all resistances. The remainder of the unconsumed energy is stored in flywheel 5. Should the resistance exceed the energy supplied, the difference will be taken from the energy stored in the flywheel. The liquid contained in annular space 10 is forced back into the accumulating cylinder 24 during the closing operation of die 21, 22.

When the two faces of the die-halves 21, 22 have met, the pressure in space 15 and in the space 25 connected with each other increases, until it will move injection plunger 15 against the action of the pressure prevailing in space 14, whereby the thermoplastic material in the heating cylinder is forced through sprue 28 into die 21, 22. The energy required is supplied in the same reciprocal action as it was the case in the closing operation between driving motor and flywheel, i. e., the pressure fluid enclosed in annular space 14 is forced into the accumulating cylinder 24 during the injecting operation. The stored energy still present in the flywheel at the end of the injecting operation is used for exerting a final pressure on the thermoplastic material already in the die cavity. When the flywheel is completely stopped, this dwell is maintained until power screw is raised by actuating respective control means. It is of advantage to cut off the motor by a limit switch during this dwell.

When power screw 4 is raised through action of the friction wheel, power screw head 7 strikes against stop 27 on its upward motion, moving pump piston 3 along during this travel. Now the energy stored in the accumulating cylinder will have the effect, through the medium of the spaces 14 and 10, of returning the two pistons, first piston 13 and then piston 3, to their starting positions. The power screw will, in its uppermost position, either release the coupling connecting the driving motor (not shown) with the flywheel by a control mechanism (not shown) or stop the motor by a limit switch. Now a new cycle begins.

It is a characteristic feature of the drive described above that the two die-halves 21 and 22 are closed with a certain pressure corresponding to the ratio of the return-stroke faces of the spaces 10 and 14 to each other and to the forward-stroke faces of pistons 2 and 13, before material is injected into the die, this closing pressure being able to produce a die opening force, and that every increase of the injection pressure gives rise to an advanced increased closing pressure.

I claim:

1. In a die-casting machine, a device for driving at least two working pistons each reciprocably mounted within a cylinder and each having inner and outer surfaces, at least one of the pistons being connected to a movable die section and at least another of the pistons being connected to an injection head of the casting machine, a pipe interconnecting the two cylinders in the part of each cylinder having the outer surface of its respective piston, a stationary die section, a pressure actuating means for intermittently applying pressure to the outer surfaces of the two pistons within the two cylinders by means of the pipe connection between the said cylinders, an accumulator containing a compressible medium in constant connection with the inner surfaces of the pistons, the proportion of the outer to the inner face of the piston connected with the movable die section being larger than the proportion of the outer to the inner faces of the other piston connected to the injection head, so that the pressure of the actuating means simultaneously exerted on the outer faces of both pistons automatically first moves the movable die section in its closing position and holds it in this position before the other piston operating the injection head begins and performs its working stroke, and that as soon as the pressure of the actuating means is released, the other piston operating the injection head is, by the pressure of the storage accumulator, first returned before the one piston, which during said stroke still remains in the die closing position, performs its return stroke.

2. A die-casting machine according to claim 1, in which the actuating means comprises a plunger which is so dimensioned that it displaces, by one single stroke, a volume of pressure fluid which is necessary for one working stroke of both working pistons.

3. A die-casting machine according to claim 1, in which the actuating means comprises a plunger which is so dimensioned that it displaces, by one single stroke, a volume of pressure fluid which is necessary for one working stroke of both working pistons, and a mechanical energy accumulator which causes the working and return strokes of the actuating plunger as well as of the two pistons according to its alternative directions of rotation.

4. A die-casting machine according to claim 1, in which the actuating means comprises a plunger which is so dimensioned that it displaces, by one single stroke, a volume of pressure fluid which is necessary for one working stroke of both working pistons, and a mechanical energy accumulator which causes the working and return strokes of the actuating plunger as well as of the two pistons according to its alternative directions of rotation, the mechanical energy accumulator comprising a flywheel and a reversible friction gearing which drives the flywheel connected to the driving plunger in two opposite directions.

5. A die-casting machine according to claim 1, in which the actuating means comprises a plunger which is so dimensioned that it displaces, by one single stroke, a volume of pressure fluid which is necessary for one working stroke of both working pistons, a mechanical energy accumulator which causes the working and return strokes of the actuating plunger as well as of the two pistons according to its alternative directions of rotation, the mechanical energy accumulator comprising a flywheel and a reversible friction gearing which drives the flywheel connected to the driving plunger in two opposite directions, and the connection between the flywheel and the driving plunger comprising a screw, the front face of the screw shaft performing an idle motion before it positively engages the piston to perform its working stroke.

WILIBALD A. VENUS.

REFERENCES CITED

The following references are of record in the file of this patent:

UNITED STATES PATENTS

| Number | Name | Date |
|---|---|---|
| 1,891,894 | Lester | Dec. 20, 1932 |
| 1,961,942 | Pack | June 5, 1934 |
| 1,966,421 | Towler | July 10, 1934 |
| 2,145,956 | Stern | Feb. 7, 1939 |

FOREIGN PATENTS

| Number | Country | Date |
|---|---|---|
| 889,751 | France | Oct. 11, 1943 |